United States Patent [19]

Hashida et al.

[11] Patent Number: 4,915,459
[45] Date of Patent: Apr. 10, 1990

[54] ANTILOCK MECHANISM

[75] Inventors: Koichi Hashida; Teruhisa Kohno; Koji Takata, all of Itami, Japan

[73] Assignee: Sumitomo Electric Industries, Ltd., Osaka, Japan

[21] Appl. No.: 353,023

[22] Filed: May 17, 1989

[30] Foreign Application Priority Data

May 31, 1988 [JP] Japan .................. 63-135040
May 31, 1988 [JP] Japan .................. 63-135041

[51] Int. Cl.⁴ .................................................. B60T 8/36
[52] U.S. Cl. .................................... 303/119; 303/116; 303/117
[58] Field of Search ............... 303/119, 117, 116, 113, 303/68; 188/181; 137/596.17, 625.65, 627.5; 251/129.14, 129.15, 129.01

[56] References Cited

U.S. PATENT DOCUMENTS

| | | | |
|---|---|---|---|
| 3,443,594 | 5/1969 | Frayer | 303/117 X |
| 3,856,047 | 12/1974 | Takayama | |
| 3,918,488 | 11/1975 | Minami | |
| 4,561,701 | 12/1985 | Fujii et al. | 303/119 |
| 4,640,558 | 2/1987 | Namura et al. | 303/119 |
| 4,715,666 | 12/1987 | Farr | |
| 4,775,193 | 10/1988 | Farr et al. | |

FOREIGN PATENT DOCUMENTS

| | | |
|---|---|---|
| 0065451 | 11/1982 | European Pat. Off. |
| 0110539 | 6/1984 | European Pat. Off. |
| 0242132 | 10/1987 | European Pat. Off. |
| 8001783 | 9/1980 | World Int. Prop. O. |

Primary Examiner—Douglas C. Butler
Attorney, Agent, or Firm—Cushman, Darby & Cushman

[57] ABSTRACT

An antilock mechanism for use in a hydraulic brake system including a hydraulic pressure source, a wheel brake, and a drain channel, includes a flow control valve and a drain valve provided in the drain channel. The flow control valve has an inlet port connected with the hydraulic pressure source, a first outlet port connected with the wheel brake, and a second outlet port connected with the drain channel. A spool is slidably inserted in the housing. The spool comprises first axial conduit and a second axial conduit separated by a wall having a fixed orifice formed therein, and is biased by a return spring. The drain valve is located adjacent the open end of the housing such that the second outlet port of the flow control valve and a valve member of the drain valve are connected straight.

5 Claims, 7 Drawing Sheets

ANTILOCK MECHANISM

BACKGROUND OF THE INVENTION

1. Field of the Invention

The present invention relates to an antilock mechanism, and specifically to an antilock mechanism of a type in an automobile brake system which detects the locking condition of the wheels using a wheel velocity detector and a vehicle velocity detector, and which when the occurrence or signs of excessive slipping due to excessive brake action are detected, operates an electromagnetic valve and reduces the the brake pressure, thus suppressing and controlling the braking force to an optimum level, regardless of brake pedal depression.

2. Description of the Prior Art

Various types of antilock mechanisms have been previously proposed. For example, in an antilock mechanism as described in Japanese Patent Laid-Open Publication No. 49-28307, a normally open inlet valve is provided in the main channel between the hydraulic pressure source (master cylinder) operated by the action of the brake pedal and the wheel cylinder in the brake device, and a normally closed drain valve is provided in the drain channel between the wheel cylinder and the brake fluid tank. Each of the inlet and drain valves are electrically operated based on a detection signal from an antilock detection means.

In such a device, during non-antilock operation, power is not supplied to either the inlet valve or the drain valve so that working fluid flows into the wheel cylinder according to the action of the brake pedal.

On the other hand, during antilock operation, that is when the fluid pressure of the brake fluid is to be reduced due to the excessive braking, power is supplied to the inlet valve and drain valve. The inlet valve closes and the drain valve opens so that working fluid at the wheel cylinder side returns to the brake fluid tank and is then pumped back to the master cylinder.

When the pressure of the brake fluid is to be raised again, electrical power is cut so that the inlet valve opens and the drain valve closes. Moreover, to hold the brake fluid pressure constant, power is supplied only to the inlet valve to close the valve, and the drain valve remains closed to keep the brake pressure constant. Thus, an antilock mechanism of this type can be controlled in three modes, pressurize, pressure release, and constant pressure, but it requires two valves operated with an electrical supply, specifically inlet and drain valves. As a result, this requires more parts, more installation steps and assembly times, and thus poses the problem of higher cost.

An antilock mechanism which resolves the above problems and simplifies device construction with a single electromagnetic valve has been proposed and disclosed, for example, in U.S. Pat. No. 4,715,666. A device disclosed in this patent is shown in FIGS. 1 and 2. In place of the electromagnetically operated inlet valve in main channel 3 connecting hydraulic pressure source 1 and wheel cylinder 2, a flow control valve 5 of non-electromagnetically operating, three-port, two-position type is provided, which is operated by return spring 4 and hydraulic pressure. Also provided is a normally closed, two-port, two-position electromagnetic drain valve 7 in drain channel 6. According to this device, the combination of flow control valve 5 and electromagnetic drain valve 7 provides a two-mode antilock control of pressurizing and pressure releasing. As shown in the figure, flow control valve 5 is arranged such that spool 12 is inserted inside housing having a bore 11 so as to slide freely in the axial direction and is biased by return spring 4. The inlet port 13, first outlet port 14, and second outlet port 15 are each provided perpendicular to the axis. The inlet port 13 is provided for flowing therethrough working fluid from the master cylinder in the bore 11. The first outlet port 14 is provided so as to flow working fluid out to the wheel cylinder, and second outlet port 15 is provided so as to flow working fluid through drain valve 7 to the working fluid storage tank.

Also, drain valve 7 has a movable valve member located close to the second outlet port 15, i.e., located in the upstream side of the sealing portion defined by the valve member and a valve seat.

In the flow control valve according to U.S. Pat. No. 4,715,666 as described before, when air bubbles are captured in return spring chamber 17, such bubbles are easily crushed by the pressure. Thus, when the pressure rises rapidly at inlet port 13, spool 12 may undesirably move into the return spring chamber 17 toward the antilock operating position as the air bubbles are crushed. Thus, the rapid pressurization may become impossible. Furthermore, when the antilock operating position as shown in FIG. 2 is established, spool 12 is shifted to the left, when viewed in FIG. 2, so that the return spring chamber 17 is substantially isolated from the drain channel 6 except for a narrow variable orifice formed at an edge 20, and thus, the bubbles stay still in the chamber 17 during the antilock operation. Also, during the non-antilock operation, the spool 12 is shifted to the right, as shown in FIG. 1, so that the working fluid actively flows through the main channel 3 to wheel cylinder 2 as indicated by arrows, and no active flow is produced through the return spring chamber 17. Thus, the bubbles are still captured in the return spring chamber 17. Thus, according to the prior art antilock mechanism, it is very difficult to make the bubbles escape from the return spring chamber 17, once they are caught in the chamber 17.

Furthermore, the difficulty of bubble escaping with this construction is not improved even when the orientation of the flow control valve is inverted, or when the drain valve is activated by electromagnetic action. Thus, when air remains in the return spring chamber 17, the movement of the spool 12 becomes erratic and so the performance of the flow control valve.

Moreover, the housing of the flow control valve requires an opening on at least one end. Thus, it is necessary to block this open end with two plugs, one for solenoid and another for flow controller which are in orthogonal relationship to each other, requiring more parts and greater assembly time, and thus incurring increased costs.

Moreover, in the re-pressurizing process with the electromagnetic drain valve closed, it is necessary to keep the leakage of fluid between the spool and the bore as little as possible, so that the amount of fluid flow to the wheel brakes will not become greater than the amount of flow determined by the return spring and orifice. To this end, it is necessary to greatly increase the manufacturing precision of the spool and the bore, resulting in the higher costs.

SUMMARY OF THE INVENTION

The present invention has been developed with a view to substantially solving the above described disadvantages and has for its essential object to provide an improved antilock mechanism which can easily eliminate bubbles captured in the return spring chamber.

It is also an object of the present invention to provide an antilock mechanism of the above described type which can be assembled with no plug at the open end of the bore of the flow control valve, i.e., the solenoid itself acts as the plug for the bore of the flow control valve.

In accomplishing these and other objects, an antilock mechanism according to the present invention has a drain channel provided in such a manner as to branch from a main channel connecting a hydraulic pressure source with wheel brake, and a drain valve which opens to the drain channel upon electrical excitation and is provided with a flow control valve at the branch junction.

The flow control valve is provided with a housing having a bore formed therein with at least one end being opened. The flow control valve comprises an inlet port connected with the hydraulic pressure source, a first outlet port connected with the wheel brake, and a second outlet port connected with the drain valve.

Inside the housing through the bore is inserted a spool comprising first axial conduit and a second axial conduit separated by a wall having a fixed orifice formed therein. The spool is biased by a return spring and sliding freely in the axial direction thereof.

Depending upon the relative axial positions of the spool and housing, during a non-antilock control condition, a large fluid passage is formed between the inlet port and the first outlet port.

During antilock pressure release condition as obtained when the drain valve is open, the large fluid passage is blocked, and a pressure releasing passage is formed between the first outlet port and second outlet port.

During antilock pressure increase condition as obtained when the drain valve is closed, a variable orifice is formed between the spool and the housing, thus forming a small fluid passage from the inlet port to the first outlet port through the fixed orifice and the variable orifice in series.

When a difference between the pressure at the inlet port and that at the first outlet port is less than a predetermined amount, the return spring exerts returning force to the spool so as to return it to the non-antilock control position.

The present invention is characterized in that the open end of the bore of the housing forms the second outlet port such that a portion of the pressure releasing passage is formed straight between the open end of the flow control valve and a valve member of the drain valve which is located in such a manner as to block the open end.

According to the present invention, the inlet port and first outlet port of the flow control valve are provided perpendicular to the axial direction of the bore in the housing. One open end of the bore of the housing forms second outlet port to the drain valve, and also forms a part of the return spring chamber. The return spring chamber is included in the pressure releasing passage, and is positioned in straight connection with the electromagnetically operating drain valve which is located in such a manner as to block the open end of the housing forming the second outlet port.

Moreover, the axial conduit formed in the axial direction in the spool is divided by a wall having a fixed orifice formed therein. The spool slides in the axial direction in the housing and is forced by the return spring provided in the housing. One side of the axial conduit forms a part of the large fluid passage, and the other side thereof forms a part of the pressure releasing passage.

Furthermore, an antilock mechanism according to the present invention is so constructed that when the small fluid passage is formed and the wheel brake pressure rises again at a constant flow rate, the pressure difference of the hydraulic pressure source and the wheel brake is not directly applied to the clearance which may form a leakage path between the housing and spool parallel to the fixed orifice.

Also, according to the present invention, the drain valve has a movable valve member located close to the drain channel, i.e., located in the downstream side of the sealing portion defined by the movable valve member and a valve seat.

According to the present invention, as hereinbefore described, a second outlet port for the flow control valve connected with the drain valve is provided on one open end in the axial direction of the housing and said second outlet port forms a part of the return spring chamber.

In operation, according to the present invention, because the return spring chamber, forms a part of the pressure releasing passage, air in the return spring chamber can be easily eliminated.

Furthermore, because the open end of the housing is blocked by the drain valve, any special plugs are not necessary to block the open end of flow control valve housing.

Furthermore, because there is no leakage passage with a large pressure difference in the clearance between the spool and the bore parallel to the fixed orifice when the small fluid passage is formed, the clearance between the spool and the bore can be made relatively large.

Furthermore, since the movable valve member of the drain valve is provided outside the return spring chamber, the volume of the return spring chamber will not be made unnecessarily large. Thus, the possibility of capturing air bubbles can be reduced.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

Figure 1:
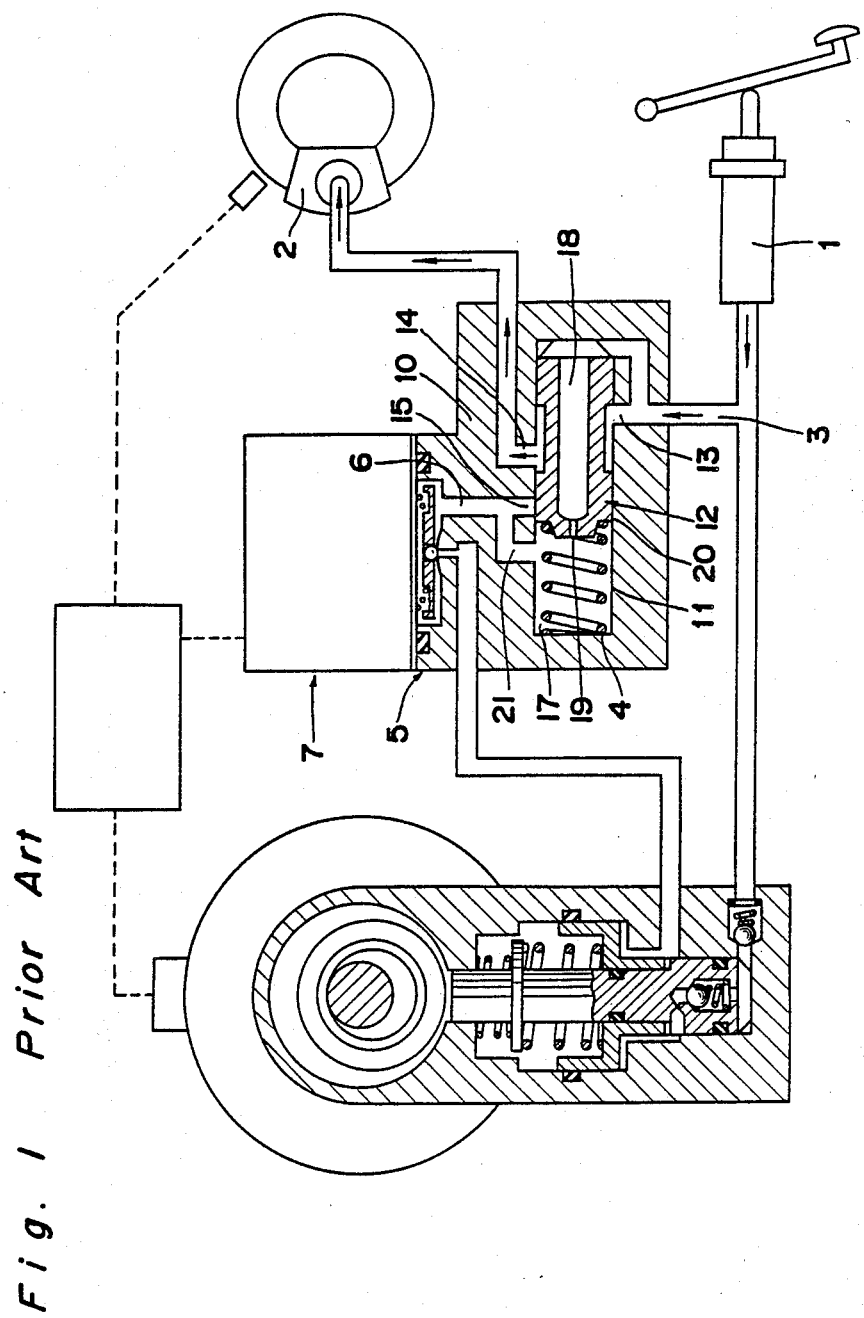
FIGS. 1 and 2 are diagrammatic views of the prior art antilock mechanism.
Figure 2:
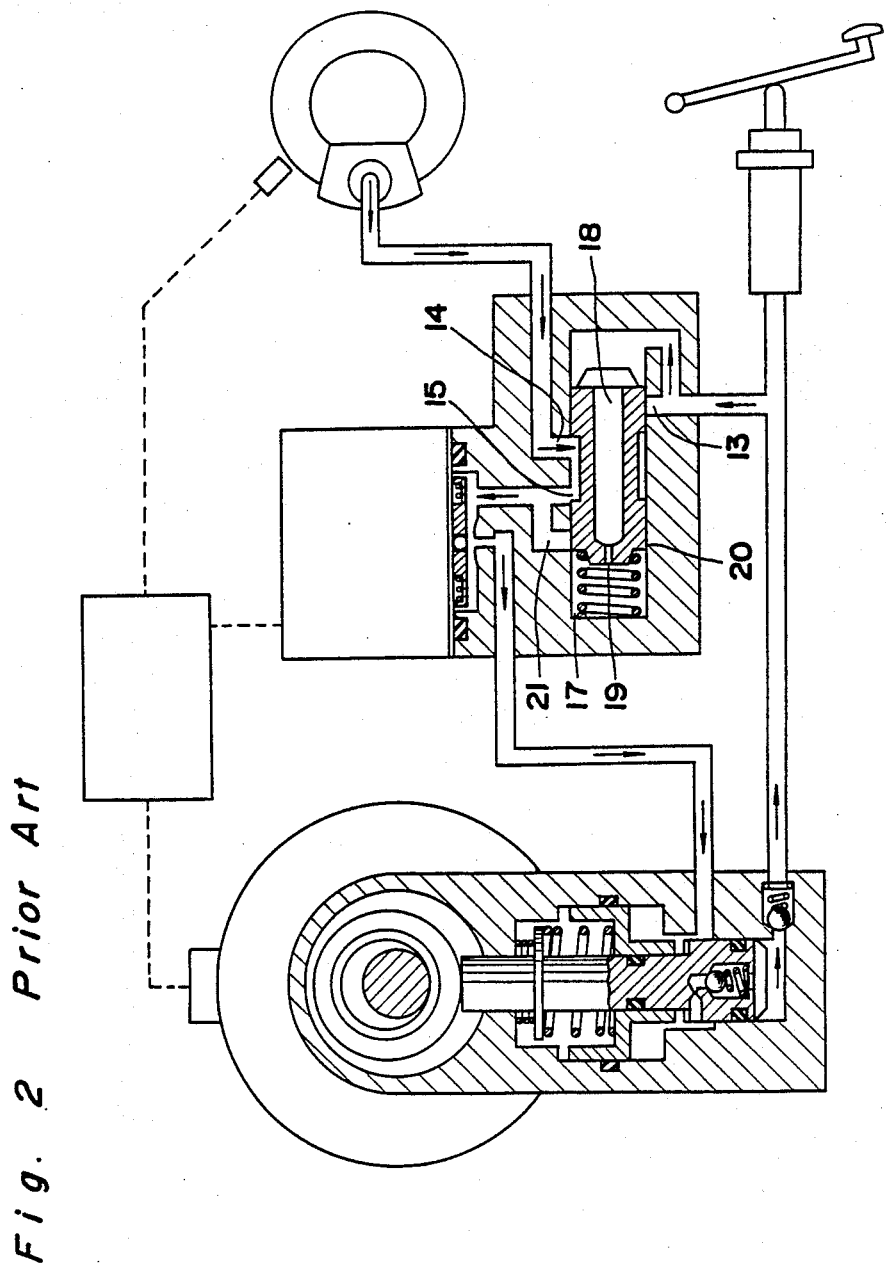
Figure 3:
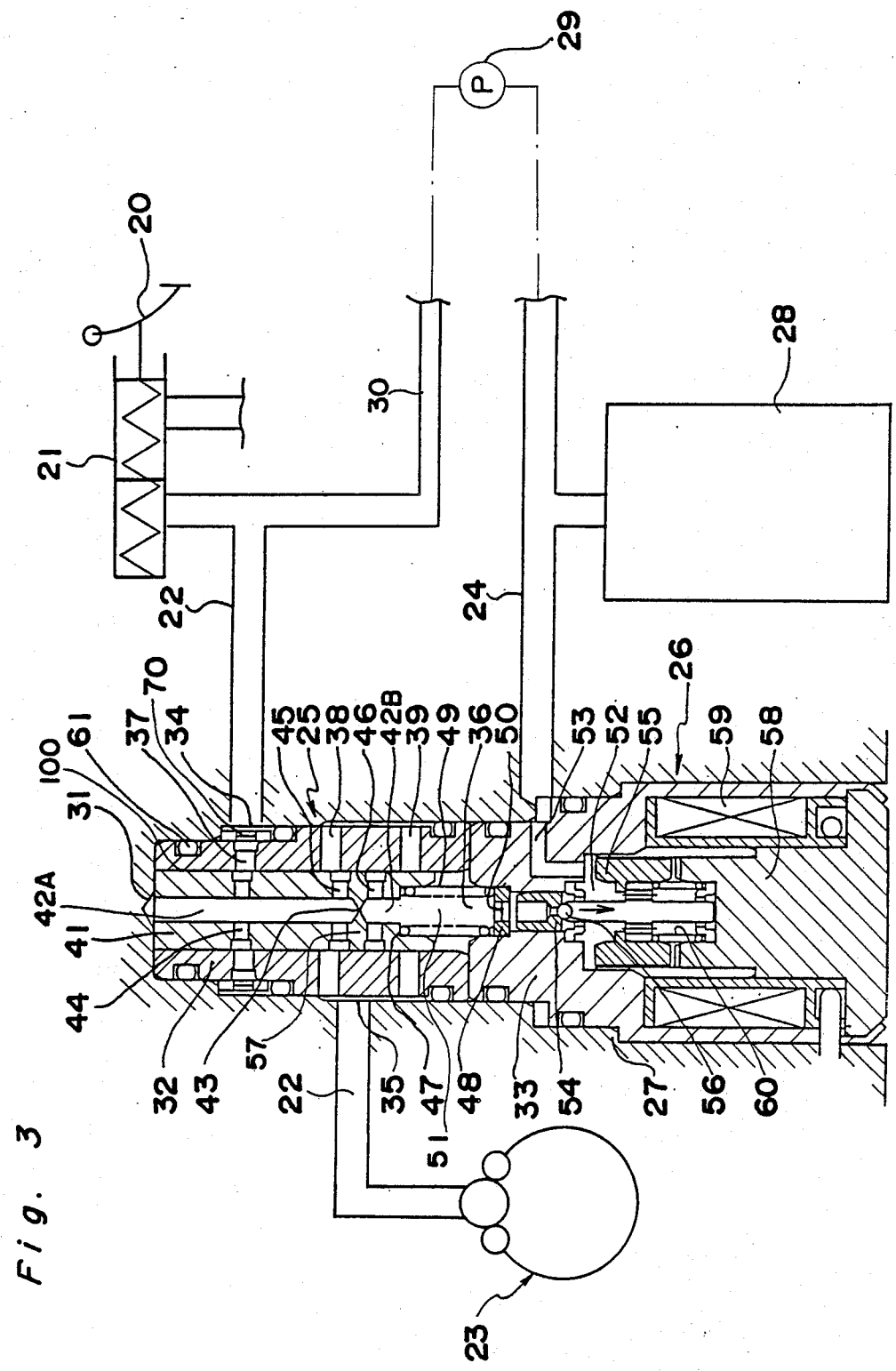
FIG. 3 is a diagrammatic views of an antilock mechanism according to a preferred embodiment of the present invention.

Referring to FIG. 3, a brake system incorporated with an antilock mechanism according to the present invention is shown. Master cylinder 21, which is the pressure source operated according to the depression of a brake pedal 20, is connected with wheel brake 23, which includes wheel cylinder, through main channel 22. A drain channel 24 branches from main channel 22. At the branch junction a flow control valve 25 and electromagnetically operated drain valve 26 are positioned in series and are installed in one cylinder block 27. The drain channel 24 is connected with a plunger pump 29 of a commonly known type through brake fluid tank 28. The plunger pump 29 is connected with the master cylinder 21 through a circulation line 30, so that the brake fluid drained to drain channel 24 is pumped by plunger pump 29 to the master cylinder 21.

According to the embodiments herein described, the arrangement after the drain channel 24 is described as having a circulation system as indicated above, but other system may be employed. For example, brake fluid tank 28 may be provided in common with a fluid tank of the master cylinder 21. In this case, the pumped fluid is directed to the master cylinder line through a hydraulic booster to compensate the drained brake fluid for the brake circuit.

Also, the brake fluid can be supplied by a so-called full power system having no master cylinder. Thus, the antilock mechanism according to the present invention can be used in combination with any known brake fluid pressure supply system and any known drain arrangement after the drain channel 24.

The construction of the flow control valve 25 and drain valve 26 positioned at the junction of main channel 22 and drain channel 24 is described below in more detail.

A cylinder hole 31 is provided in the cylinder block 27. Sleeve 32 having a bore 100 is fixed inside cylinder hole 31, and drain valve 26 comprised of an electromagnetic valve is positioned so as to block the open end of cylinder hole 31. It is to be noted that block 27, together with sleeve 32, defines a housing for flow control valve 25.

The sleeve 32 is provided so as to improve the machining of the bore arrangement described above and, therefore, it is possible to directly form the bore arrangement to the cylinder block 27 so as to eliminate the use of sleeve 32.

Both ends of the sleeve 32 are open. One end is fixed to the bottom of cylinder hole 31, and the other end held in contact with and mounted to frame 33 of drain valve 26. Between the outside circumference of sleeve 32 and the inside circumference of cylinder hole 31 is formed a brake fluid inlet port 34 leading to the master cylinder 21 of main channel 22. Also, a first outlet port 35 is formed for brake fluid leading to the wheel brake 23. In addition, at the axial center opening on the side leading to frame 33, a second outlet port 36 is formed to direct brake fluid in straight line to the drain valve 26. A filter 70 is mounted at brake fluid inlet port 34 to collect dust and foreign matter in the working fluid inflowing from the master cylinder Furthermore, provided in sleeve 32 are an inlet conduit 37 passing in the radial direction to inlet port 34, and a first outlet conduit 38 and second outlet conduit 39 passing in the radial direction to first outlet port 35.

Fittingly and slidably inserted inside sleeve 32 is a spool 41 which slides freely in the axial direction. In the axial center of spool 41 are formed first axial conduit 42A and second axial conduit 42B separated by a wall 57 having an orifice 43 formed in the axial direction. Furthermore, from the bottom side of spool 41 a first radial conduit 44 and second radial conduit 45 are provided in the radial direction to first axial conduit 42A, and a third radial conduit 46 is provided in the radial direction to second axial conduit 42B. The first radial conduit 44 opens and closes first inlet conduit 37 according to the movement of spool 41, and the edges of these conduits form the metering edge of the variable orifice which will be explained later. The second radial conduit 45 and third radial conduit 46 are formed in front of and behind orifice 43 so as to sandwich the orifice, and each of the first outlet conduit 38 and second outlet conduit 39 opens and closes according to the movement of spool 41.

The tip of spool 41 is configured so as to form spring holder 47, which compresses return spring 49 between spring holder 47 and spring holder 48 affixed to the end surface of frame 33 opposite to the second outlet port 36 of sleeve 32. A filter 50 is mounted to the spring holder 48 for collecting foreign matter from the brake fluid outflowing to the drain valve 26 through return spring chamber 51 encompassed by sleeve 32, spool 41, and frame 33.

A fixed valve seat 54 is affixed to the frame 33, and the fixed valve seat 54 is opened and closed by movable valve member 56, which will be described later. Thus, second outlet port 36 formed at the open end in the axial direction of sleeve 32 of flow control valve 25 is placed in series in the same direction with the drain valve 26 in such a manner that brake fluid from second outlet port 36 flows straight into drain valve 26.

Centered axially to frame 33 of drain valve 26 is formed a large diameter valve chamber 52 in line and connected with second outlet port 36 via the valve seat 54. Outlet conduit 53 leading from valve chamber 52 to drain channel 24 is also formed in frame 33. An armature 55 is slidably fitted inside valve chamber 52 so as to slide freely in the axial direction. The fixed valve seat 54 is opened and closed by movable valve member 56 mounted to the armature 55. In other words, fixed valve seat 54 and movable valve member 56, forming the sealing portion of drain valve 26, are positioned, respectively, on the side of second outlet port 36 and on the side of the valve chamber 52 of the drain valve 26. In frame 33 stator 58 is assembled at a position opposite to armature 55, and is wound with a coil 59. When electricity is applied, coil 59 becomes excited to drive armature 55 and movable valve member 56 in the direction of the arrow, and thus opening fixed valve seat 54. Furthermore, a spring 60 is compressed between armature 55 and stator 58 so that when electricity is not applied, the force of spring 60 closes the fixed valve seat 54 with movable valve member 56.

It is to be noted that movable valve member 56 and armature 55 can be formed together or separately. In the later case, it is possible to further provide a center adjusting mechanism between the valve member 56 and armature 55.

In FIG. 3, reference number 61 indicates O-rings fitted to prevent brake fluid leakage.

The brake fluid tank 28 and plunger pump 29 can be constructed in a commonly known way, and further description herein is omitted for brevity.

The operation of a brake system comprised of an antilock mechanism according to the present invention as constructed according to the description provided above operates as described below.

Figure 4A:
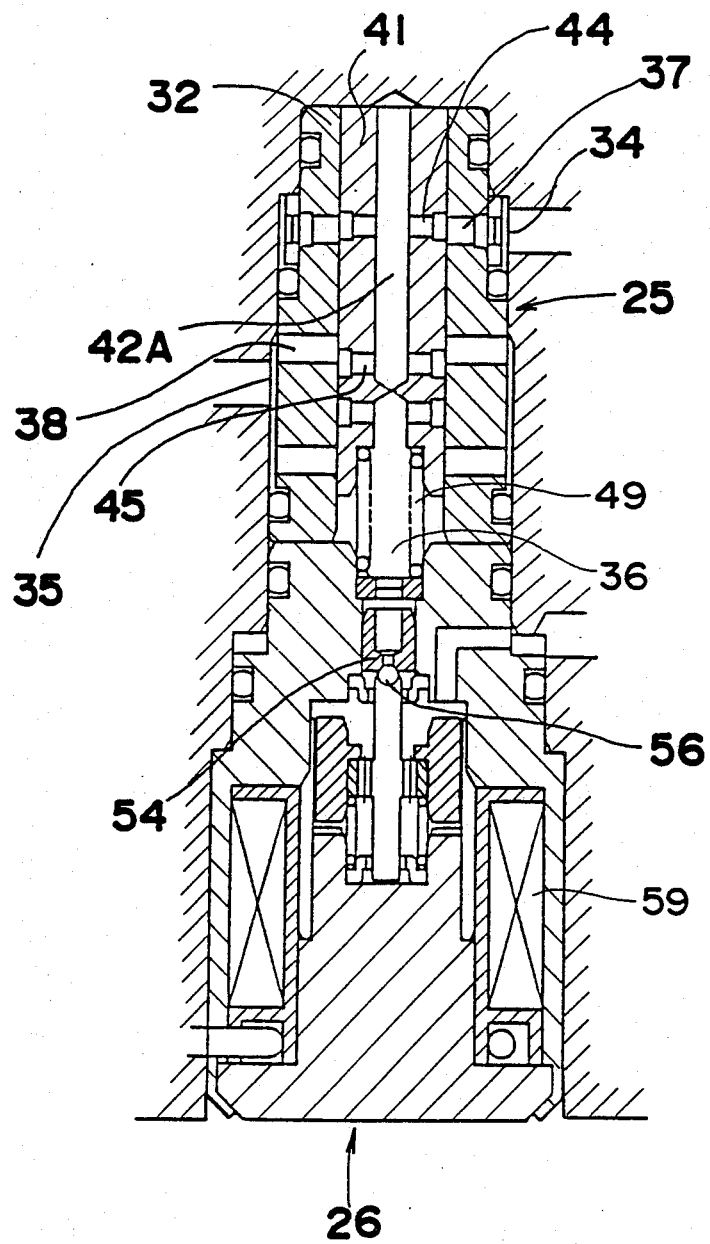
FIGS. 4a, 4b, 4c and 4d are cross sectional views showing different operating positions of the antilock mechanism of FIG. 3.

Referring to FIG. 4a, a normal operating condition, i.e., non-antilock control condition is shown. In this condition, a large fluid passage is established from the hydraulic pressure source to the wheel brake. At the non-antilock control condition, power is not supplied to electromagnetic drain valve 26. Thus, coil 59 is not excited, so that movable valve member 56 closes the fixed valve seat 54, and the second outlet port 36 of flow control valve 25 is also closed. During the non-antilock control condition, spool 41 is pressed by return spring 49 and is shifted to the upper end, as shown in FIG. 4a. Thus, brake fluid inlet port 34 and the first inlet conduit 37 of sleeve 32 are open to first radial conduit 44 of spool 41, and second radial conduit 45 is open to first outlet conduit 38 of sleeve 32. Thus, brake fluid inlet port 34 of flow control valve 25 is open to first outlet port 35 through the large fluid passage formed by inlet conduit 37, first radial conduit 44, first axial conduit 42A, second radial conduit 45, and first outlet conduit 38. In this manner, brake fluid is sent from master cylinder 21 to wheel brake 23, and the amount thereof depends on the operation of the brake pedal 20, and the brake is thus controlled.

Figure 4B:
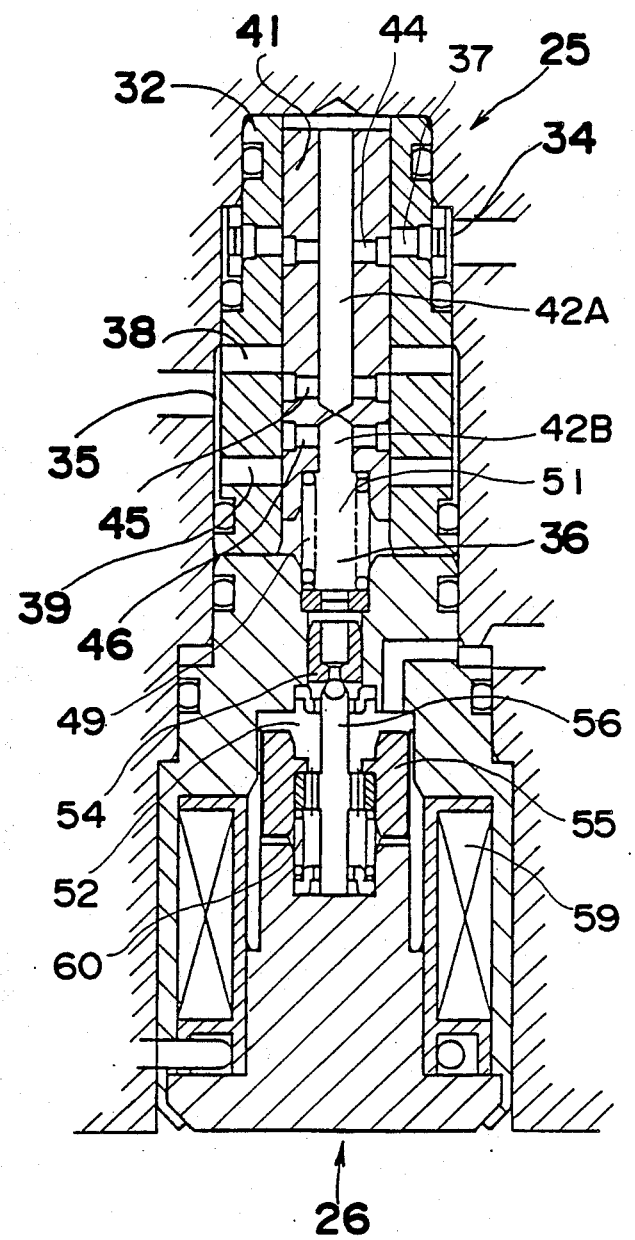

Referring to FIG. 4b, an intermediate condition is shown in which the large fluid passage is just shut off.

When the wheel velocity detector (not shown in the figure) or other means detects the occurrence of signs of excessive slipping and indicates an antilock condition, electricity is supplied to excite coil 59 of drain valve 26. Thus, armature 55 starts to descend as shown in FIG. 4b, and thus movable valve member 56 descends against spring 60 to open fixed valve seat 54, thereby permitting brake fluid to drain from second outlet port 36 of flow control valve 25 to valve chamber 52. Therefore, a pressure difference arises between the first and second axial conduits 42A and 42B, i.e., between the pressure at the top of spool 41 open to brake fluid inlet port 34, inlet conduit 37, first radial conduit 44, and first axial conduit 42A and the pressure at the bottom of spool 41 facing the second axial conduit 42B, the spring chamber 51 and the second outlet port 36. A force dependent upon this pressure difference causes spool 41 to work against the force of return spring 49 and move downwardly. Thus, as shown in FIG. 4b, the passage between second radial conduit 45 of spool 41 and first outlet conduit 38 of sleeve 32 is blocked to close the large fluid passage. Similarly, because the passage between third radial conduit 46 of spool 41 and second outlet conduit 39 of sleeve 32 is also closed, the supply and drain of brake fluid to and from the second outlet port 35 is stopped, thereby holding the fluid pressure in the wheel brake 23 constant.

This cut off condition helps the downward movement of the spool 41, but it is also possible to sequre a very small passage between second axial conduit 42B or spring chamber 51 and the outlet port 35 before pressure releasing passage is fully established.

Figure 4C:
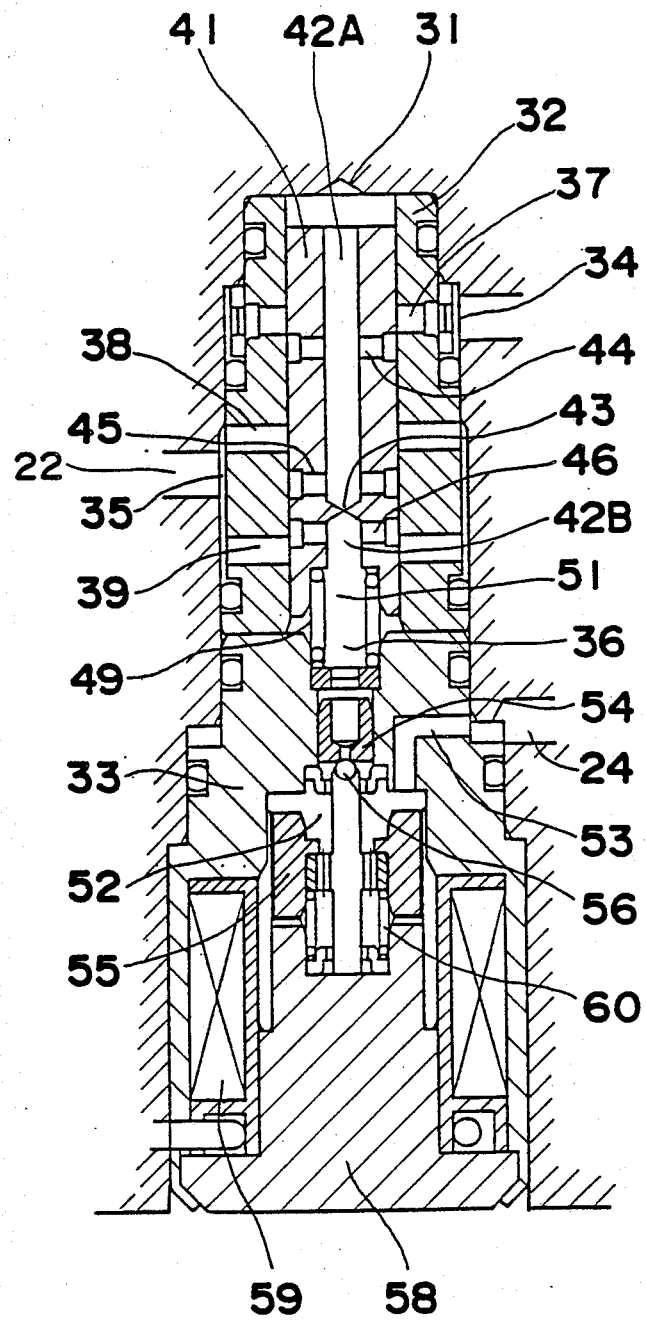

Referring to FIG. 4c, an antilock pressure release condition is shown in which the brake pressure in the wheel brake 23 is released through a pressure releasing passage defined from wheel brake 23, main channel 22, first outlet port 35, second outlet conduit 39, third radial conduit 46, second axial conduit 42B, return spring chamber 51, second outlet port 36, fixed valve seat 54 with movable valve member 56, valve chamber 52, outlet conduit 53 and drain channel 24, to reduce the braking of the wheel regardless of the brake pedal operation. The antilock pressure release condition is obtained during the antilock brake operation, as explained below.

When the outflow from drain valve 26 proceeds further than the intermediate condition as shown in FIG. 4b, spool 41 further descends, and when the position shown in FIG. 4c is reached, third radial conduit 46 of spool 41 is open to second outlet conduit 39 of sleeve 32, and the pressure releasing passage is formed in which first outlet port 35 is open to second outlet port 36 by way of radial second outlet conduit 39, third radial conduit 46, second axial conduit 42B, and return spring chamber 51. Thus, the brake fluid inside wheel brake 23 passes second outlet port 36, flows to drain channel 24 through drain valve 26, which is open, the brake pressure drops, and antilock control is applied.

When spool 41 descends further, first radial conduit 44 reaches a position at which it is not open to inlet conduit 37, and the inflow of brake fluid from brake fluid inlet port 34 is blocked. In this state, if the cross sectional area of spool 41 is defined as A, the force of return spring 49 is defined as F, and the brake pressure (specifically, equivalent to the pressure of second axial conduit 42B in this state) is defined as P, the pressure of first axial conduit 42A sandwiching the orifice 43 with conduit 42B can be expressed as the equilibrium pressure which is maintained at $P+F/A$. Hereinafter, the value $F/A$ is expressed as $\Delta P$. If the supply of electricity to the drain valve continues, this equilibrium will be maintained while brake pressure P decreases.

Figure 4D:
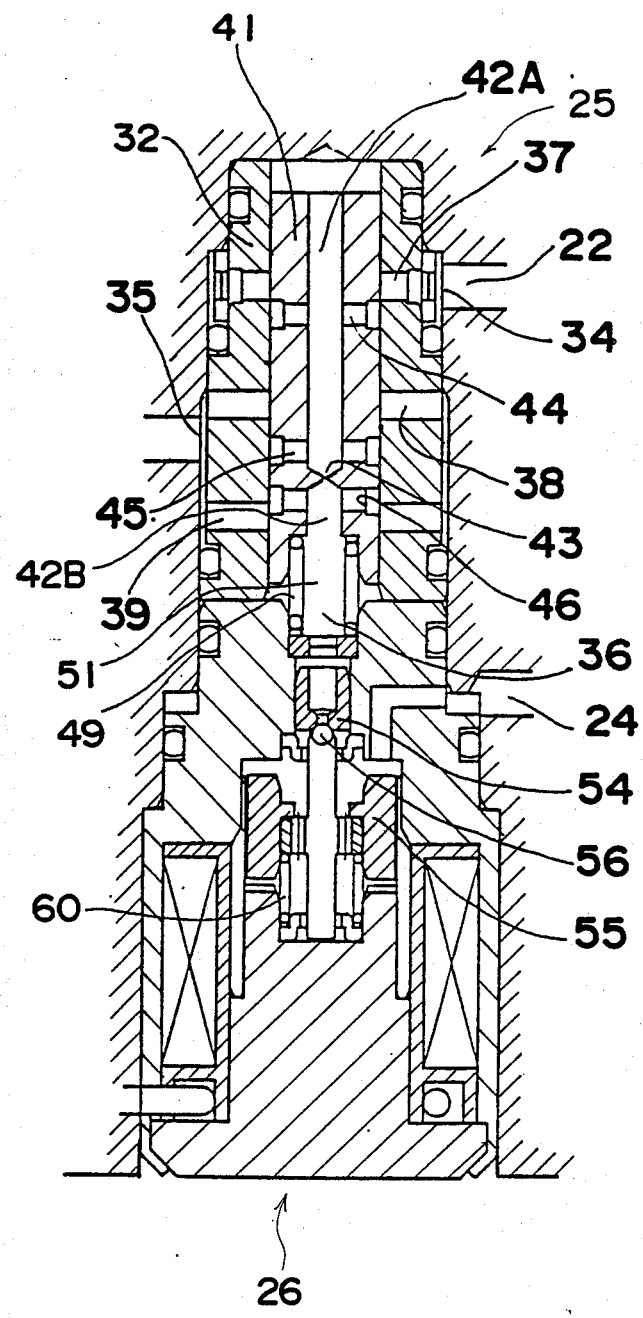

Now, referring to FIG. 4d, when the antilock control turns to the pressure increase condition and electricity supplied to drain valve 26 is cut, movable valve member 56 is pressed by spring 60 and moves to close fixed valve seat 54, thus closing drain valve 26. Thus, draining of working fluid from second outlet port 36 of flow control valve 25 stops. In this state, during the period in which the pressure difference between the pressure of the hydraulic pressure source and that of the wheel brake exceeds the predetermined pressure $\Delta P$, the pressure difference $\Delta P$ determined by the force of return spring 49 acting on spool 41 and the cross sectional area of spool 41 is produced at the front and back of fixed orifice 43 provided in spool 41. A variable orifice which allows only a flow rate equivalent to that determined by the area of fixed orifice 43 and this pressure difference is formed at the cut-off edges of first radial conduit 44 and inlet conduit 37, and a small fluid passage serially through both orifices is formed between the hydraulic pressure source and the wheel brake, i.e., from hydraulic pressure source 21 through main channel 22, brake fluid inlet port 34, inlet conduit 37, the variable orifice, first radial conduit 44, first axial conduit 42A, fixed orifice 43, second axial conduit 42B, third radial conduit 46, second outlet conduit 39, first outlet port 35, main channel 22, to wheel brake 23. Thus, when the pressure difference between 42A and 42B is greater than $\Delta P$, spool 41 is forced down, so that the opening between inlet conduit 37 and first radial conduit 44 is constricted. And, when that pressure difference is less than $\Delta P$, spool 41 is pushed up and the opening expands. Therefore, the opening forms a variable orifice through which flows only that much working fluid required to maintain the aforementioned constant pressure difference.

Furthermore, if said pressure difference is maintained at ΔP, the flow rate through fixed orifice 43 is constant. Thus, the opening of the variable orifice is automatically adjusted to maintain the same constant flow rate as that through the fixed orifice.

Thus, a small constant flow of working fluid passing orifice 43 is supplied to wheel brake 23, thereby gradually raising the brake pressure.

At this time, when the small fluid passage is formed, no leaking passage is formed in the clearance between spool 41 and housing 32 connecting the inlet port 34 with the first outlet port 35, which is subjected to the pressure difference between the pressure at the inlet port 34 and the pressure at the first outlet port 35, and is parallel with the fixed orifice. The only leaking passage which is subjected to the full pressure difference is serial to orifice 43 and, therefore, leakage through this passage is adjusted by the variable orifice insofar as it is less than the flow rate of the fixed orifice, and therefore poses no problems. Other leakage is minimal because only the pressure difference of ΔP is applied to the other clearances between spool 41 and bore 100.

When pressure difference between the brake fluid inlet port 34 and first outlet port 35 gradually decreases, due to the supply of working fluid via the small fluid passage, and reaches the value ΔP, spool 41 is returned to the position shown in FIG. 4a by the force of return spring 49, and the large fluid passage previously described is established again.

When air bubbles exist in return spring chamber 51 of flow control valve 25 in an antilock mechanism according to the present invention, such air bubbles can be easily eliminated, regardless of orientation of the antilock mechanism of the present invention, as explained below.

When the antilock mechanism is oriented in such a position that second outlet port 36 is located at the bottom as shown in FIG. 3, spool 41 is moved to the gradual pressurizing state, shown in FIG. 4d, by the compression of the air, if there is any, in return spring chamber 51 when pressure is applied to brake fluid inlet port 34. At this time, because third radial conduit 46 of spool 41 is at a position near the top of return spring chamber 51 and third radial conduit 46 is opened to second outlet conduit 39 of sleeve 32 by the movement of spool 41, the air bubbles inside return spring chamber 51 is pushed out through third radial conduit 46, second outlet conduit 39, and first outlet port 35, by the flow of fluid through the small fluid passage. When the air inside return spring chamber 51 is purged, the undesirable movement of spool 41 ceases, so that spool 41 will be returned to the position shown in FIG. 4a by the force of return spring 49, and the air in the first axial conduit 42A is rapidly eliminated by the flow through the large fluid passage. In this way, residual air inside the return spring chamber of the flow control valve can be easily eliminated without any opening operation of the drain valve 26.

On the other hand, if the arrangement shown in FIG. 3 is inverted so that second outlet port 36 is positioned at the top, the return spring chamber is included in the pressure releasing passage when drain valve 26 is opened and the pressure releasing passage is opened. Thus, since the pressure releasing passage is a wide channel not passing through an orifice, the air inside the return spring chamber can be quickly eliminated to the drain channel when the drain valve 26 is operated.

It is noted that the smaller the volume of the return spring chamber is, the more the air elimination is effective. In this respect, according to the present invention, since the movable valve member 56, armature 55 and spring 60 of the drain valve 26 are located outside the return spring chamber 51, i.e., on the side of drain channel 24, the return spring chamber is made with a minimum necessary capacity.

As thus described, air elimination can be easily and quickly performed with an antilock mechanism according to the present invention even if the second outlet port 36 is positioned at the top or the bottom.

According to the antilock mechanism of the present invention, such excellent bleeding capability as described is obtained by the construction that the passage formed in the axial direction inside the flow control valve is divided by the orifice such that the passage on one side forms a part of the large passage open to the inlet port and the first outlet port, and that the passage on the other side forms a part of the pressure releasing passage open to the first outlet port and second outlet port.

Moreover, because the drain valve which is an electromagnetic valve blocks the open end of the bore 100 of the housing, the plug which has been conventionally required to block the bore is not required.

Furthermore, when the small fluid passage is formed, no leakage passage is formed in the clearance between the spool and the housing, which is subjected to the full pressure difference and at the same time forms a path parallel to the fixed orifice. This permits the clearance between the spool and the housing to be relatively large. Thus, the spool and the housing can be easily manufactured, and undesirable sticking between the two can be prevented.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An antilock mechanism which has a drain channel provided in such a manner as to branch from a main channel connecting a hydraulic pressure source with wheel brake, and a drain valve which opens to the drain channel upon electrical excitation and is provided with a flow control valve at said branch junction;

said flow control valve being provided with a housing having a bore formed therein with at least one end being opened, said flow control valve comprising an inlet port connected with said hydraulic pressure source, a first outlet port connected with said wheel brake, and a second outlet port connected with said drain valve;

inside said housing through said bore being inserted a spool comprising first axial conduit and a second axial conduit separated by a wall having a fixed orifice formed therein, said spool being biased by a return spring and sliding freely in the axial direction thereof;

depending upon the relative axial positions of said spool and housing, during a non-antilock control condition, a large fluid passage being formed between said inlet port and said first outlet port;

during antilock pressure release condition as obtained when the drain valve is open, said large fluid passage being blocked, and a pressure releasing passage being formed between said first outlet port and second outlet port;

during antilock pressure increase condition as obtained when the drain valve is closed, a variable orifice being formed between the spool and the housing, thus forming a small fluid passage from the inlet port to the first outlet port through said fixed orifice and said variable orifice in series;

and when a difference between the pressure at said inlet port and that at said first outlet port is less than a predetermined amount, said return spring exerts returning force to said spool so as to return it to the non-antilock control position;

characterized in that:

said open end of the bore of said housing forms said second outlet port such that a portion of said pressure releasing passage is formed straight between said open end of said flow control valve and a valve member of said drain valve which is located in such a manner as to block said open end.

2. An antilock mechanism which has a drain channel provided in such a manner as to branch from a main channel connecting a hydraulic pressure source with wheel brake, and a drain valve which opens to the drain channel upon electrical excitation and is provided with a flow control valve at said branch junction;

said flow control valve being provided with a housing having a bore formed therein with at least one end being opened, said flow control valve comprising an inlet port connected with said hydraulic pressure source, a first outlet port connected with said wheel brake, and a second outlet port connected with said drain valve;

inside said housing through said bore being inserted a spool comprising first axial conduit and a second axial conduit separated by a wall having a fixed orifice formed therein, said spool being biased by a return spring and sliding freely in the axial direction thereof;

depending upon the relative axial positions of said spool and housing, during a non-antilock control condition, a large fluid passage being formed between said inlet port and the first outlet port;

during antilock pressure release condition as obtained when the drain valve is open, said large fluid passage being blocked, and a pressure releasing passage being formed between said first outlet port and second outlet port;

during antilock pressure increase condition as obtained when the drain valve is closed, a variable orifice being formed between the spool and the housing, thus forming a small fluid passage from the inlet port to the first outlet port through said fixed orifice and said variable orifice in series;

and when a difference between the pressure at said inlet port and that at said first outlet port is less than a predetermined amount, said return spring exerts returning force to said spool so as to return it to the non-antilock control position;

characterized in that:

said drain valve comprises:

a fixed valve seat formed with an opening and located adjacent said second outlet port of said flow control valve;

a movable valve member provided to open and close said fixed valve seat and located downstream side of said drain valve;

biasing means provided in association with said movable valve member for biasing said movable valve member to close said fixed valve seat against the pressure prevailing in said outlet port; and solenoid means provided in association with said movable valve member for shifting, when excited, said movable valve member against said biasing means to open said fixed valve seat.

3. An antilock mechanism which has a drain channel provided in such a manner as to branch from a main channel connecting a hydraulic pressure source with wheel brake, and a drain valve which opens to the drain channel upon electrical excitation and is provided with a flow control valve at said branch junction;

said flow control valve being provided with a housing having a bore formed therein with at least one end being opened, said flow control valve comprising an inlet port connected with said hydraulic pressure source, a first outlet port connected with said wheel brake, and a second outlet port connected with said drain valve;

inside said housing through said bore being inserted a spool comprising first axial conduit and a second axial conduit separated by a wall having a fixed orifice formed therein, said spool being biased by a return spring and sliding freely in the axial direction thereof;

depending upon the relative axial positions of said spool and housing, during a non-antilock control condition, a large fluid passage being formed between said inlet port and the first outlet port;

during antilock pressure release condition as obtained when the drain valve is open, said large fluid passage being blocked, and a pressure releasing passage being formed between said first outlet port and second outlet port;

during antilock pressure increase condition as obtained when the drain valve is closed, a variable orifice being formed between the spool and the housing, thus forming a small fluid passage from the inlet port to the first outlet port through said fixed orifice and said variable orifice in series;

and when a difference between the pressure at said inlet port and that at said first outlet port is less than a predetermined amount, said return spring exerts returning force to said spool so as to return it to the non-antilock control position;

characterized in that:

said first axial conduit forms a part of said large fluid passage, and said second axial conduit forms a part of said pressure releasing passage.

4. An antilock mechanism which has a drain channel provided in such a manner as to branch from a main channel connecting a hydraulic pressure source with wheel brake, and a drain valve which opens to the drain channel upon electrical excitation and is provided with a flow control valve at said branch junction;

said flow control valve being provided with a housing having a bore formed therein with at least one end being opened, said flow control valve comprising an inlet port connected with said hydraulic pressure source, a first outlet port connected with said wheel brake, and a second outlet port connected with said drain valve;

inside said housing through said bore being inserted a spool comprising first axial conduit and a second axial conduit separated by a wall having a fixed orifice formed therein, said spool being biased by a return spring and sliding freely in the axial direction thereof;

depending upon the relative axial positions of said spool and housing, during a non-antilock control condition, a large fluid passage being formed between said inlet port and the first outlet port;

during antilock pressure release condition as obtained when the drain valve is open, said large fluid passage being blocked, and a pressure releasing passage being formed between said first outlet port and second outlet port;

during antilock pressure increase condition as obtained when the drain valve is closed, a variable orifice being formed between the spool and the housing, thus forming a small fluid passage from the inlet port to the first outlet port through said fixed orifice and said variable orifice in series;

and when a difference between the pressure at said inlet port and that at said first outlet port is less than a predetermined amount, said return spring exerts returning force to said spool so as to return it to the non-antilock control position;

characterized in that:

when said small fluid passage is formed, no leaking passage is formed in a clearance between the spool and the bore connecting said inlet port with said first outlet port, which is subjected to the pressure difference between the pressure at said inlet port and the pressure at said first outlet port, and is parallel with said fixed orifice.

5. An antilock mechanism which has a drain channel provided in such a manner as to branch from a main channel connecting a hydraulic pressure source with wheel brake, and a drain valve which opens to the drain channel upon electrical excitation and is provided with a flow control valve at said branch junction;

said flow control valve being provided with a housing having a bore formed therein with at least one end being opened, said flow control valve comprising an inlet port connected with said hydraulic pressure source, a first outlet port connected with said wheel brake, and a second outlet port connected with said drain valve;

inside said housing through said bore being inserted a spool comprising first axial conduit and a second axial conduit separated by a wall having fixed orifice formed therein, said spool being biased by a return spring and sliding freely in the axial direction thereof;

depending upon the relative axial positions of said spool and housing, during a non-antilock control condition, a large fluid passage being formed between said inlet port and the first outlet port;

during antilock pressure release condition as obtained when the drain valve is open, said large fluid passage being blocked, and a pressure releasing passage being formed between said first outlet port and second outlet port;

during antilock pressure increase condition as obtained when the drain valve is closed, a variable orifice being formed between the spool and the housing, thus forming a small fluid passage from the inlet port to the first outlet port through said fixed orifice and said variable orifice in series;

and when a difference between the pressure at said inlet port and that at said first outlet port is less than a predetermined amount, said return spring exerts returning force to said spool so as to return it to the non-antilock control position;

characterized in that:

said housing being formed with a first conduit means connected with said inlet port, a second conduit means connected with said first outlet port and a third conduit means connected with said first outlet port;

said spool being formed with a first radial conduit radially extending from said first axial conduit, a second radial conduit radially extending from said first axial conduit, and a third radial conduit radially extending from said second axial conduit;

whereby said large fluid passage is formed through said first conduit means, first radial conduit, first axial conduit, second radial conduit and second conduit means, and said small fluid passage is formed through said first conduit means, said variable orifice defined by the edges of said first conduit means and first radial conduit, said first radial conduit, first axial conduit, fixed orifice, second axial conduit, third radial conduit, and third conduit means.

* * * * *